US011081975B2

(12) United States Patent
Gandhi et al.

(10) Patent No.: US 11,081,975 B2
(45) Date of Patent: Aug. 3, 2021

(54) SOMERSAULTING MOTION OF SOFT BODIED STRUCTURE

(71) Applicant: Toyota Motor Engineering & Manufacturing North America, Inc., Plano, TX (US)

(72) Inventors: Umesh N. Gandhi, Farmington Hills, MI (US); Danil V. Prokhorov, Canton, MI (US); Michael Paul Rowe, Pinckney, MI (US); Ryohei Tsuruta, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 443 days.

(21) Appl. No.: 16/170,978

(22) Filed: Oct. 25, 2018

(65) Prior Publication Data
US 2020/0136526 A1    Apr. 30, 2020

(51) Int. Cl.
*H02N 1/00* (2006.01)
*F15B 21/06* (2006.01)
(Continued)

(52) U.S. Cl.
CPC .................... *H02N 1/006* (2013.01)

(58) Field of Classification Search
CPC ........ H02N 1/006; H02N 1/004; H02N 1/002; H02N 1/00; H02N 2/0015; H02N 2/0005;
(Continued)

(56) References Cited

U.S. PATENT DOCUMENTS 2,241,086 A    1/1939  Gould
4,286,910 A    9/1981  Conrad
(Continued)

FOREIGN PATENT DOCUMENTS

JP    2007097292 A    4/2007
KR    20050056526 A    6/2005
(Continued)

OTHER PUBLICATIONS

Yang et al., "Novel Design and Three-Dimensional Printing of Variable Stiffness Robotic Grippers," Dec. 2016, ASME Journal of Mechanisms and Robotics, vol. 8, pp. 061010-1 to 061010-15 (15 pages).
(Continued)

*Primary Examiner* — Edgardo San Martin
(74) *Attorney, Agent, or Firm* — Christopher G. Darrow; Darrow Mustafa PC

(57) ABSTRACT

The soft bodied structures and systems for controlling such devices are described herein. The soft bodied structures can, through a series of soft hydraulic actuators, move from a first position to a second position by a somersaulting motion. The system can include connecting to a first contact point of the surface using a surface attachment. The rigidity of the controllably resistive material can then be increased. The medial hydraulic actuators can be actuated to expand the exterior medial surface, creating a bend. The device can then attach to a second contact point using the surface attachment and the end portion actuator of the unattached end portion. Then, the surface attachment of the first attached end portion can detach. The medial hydraulic actuators and the controllably resistive material can then relax, followed by detaching the surface attachment of the second attached end portion.

20 Claims, 7 Drawing Sheets

(51) Int. Cl.
*F15B 15/08* (2006.01)
*B25J 9/06* (2006.01)
*B25J 18/06* (2006.01)

(58) Field of Classification Search
CPC ......... H02N 2/00; F15B 21/065; F15B 21/06; F15B 15/08; F15B 15/088; F15B 15/10; F03G 7/00; F03G 7/06; F03G 7/065; B25J 9/06; B25J 9/065; B25J 9/12; B25J 9/14; B25J 9/142; B25J 11/00; B25J 18/06; B62D 57/02; H01L 41/0926; H01L 41/0953
See application file for complete search history.

(56) References Cited

U.S. PATENT DOCUMENTS

| | | | |
|---|---|---|---|
| 4,319,427 A | 3/1982 | Way, Jr. | |
| 4,726,656 A | 2/1988 | Schofield et al. | |
| 4,848,179 A * | 7/1989 | Ubhayakar | B25J 9/06 74/490.04 |
| 4,958,100 A * | 9/1990 | Crawley | H01L 41/0835 310/319 |
| 4,964,062 A * | 10/1990 | Ubhayakar | B25J 9/0084 244/172.5 |
| 5,021,798 A * | 6/1991 | Ubhayakar | B25J 9/0084 343/762 |
| 5,065,978 A | 11/1991 | Albarda et al. | |
| 5,502,345 A * | 3/1996 | Kahn | H01L 41/0926 310/328 |
| 5,668,432 A * | 9/1997 | Tominaga | B25J 7/00 310/317 |
| 5,705,751 A | 1/1998 | Briefer et al. | |
| 6,065,978 A | 5/2000 | Dehan et al. | |
| 6,120,002 A | 9/2000 | Biegelsen et al. | |
| 6,215,221 B1 | 4/2001 | Cabuz et al. | |
| 6,490,960 B1 | 12/2002 | Jackson et al. | |
| 6,685,442 B2 | 2/2004 | Chinn et al. | |
| 6,939,291 B2 | 9/2005 | Phee Soo Jay | |
| 7,064,472 B2 | 6/2006 | Pelrine et al. | |
| 7,353,747 B2 | 4/2008 | Swayze et al. | |
| 7,484,735 B2 | 2/2009 | Verbrugge et al. | |
| 7,521,840 B2 | 4/2009 | Heim | |
| 7,575,807 B1 * | 8/2009 | Barvosa-Carter | F03G 7/065 428/411.1 |
| 7,673,562 B2 | 3/2010 | Pattekar et al. | |
| 7,755,840 B2 * | 7/2010 | Batchko | B33Y 80/00 359/665 |
| 7,892,630 B1 | 2/2011 | McKnight et al. | |
| 7,901,524 B1 | 3/2011 | McKnight et al. | |
| 7,905,538 B2 | 3/2011 | Ukpai et al. | |
| 8,222,799 B2 | 7/2012 | Polyakov et al. | |
| 8,240,677 B2 | 8/2012 | Browne et al. | |
| 8,272,392 B2 | 9/2012 | Pattekar et al. | |
| 8,430,810 B2 | 4/2013 | Hassidov et al. | |
| 8,863,608 B2 | 10/2014 | Fischer et al. | |
| 9,061,118 B2 | 6/2015 | Shoham et al. | |
| 9,764,113 B2 | 9/2017 | Tuval et al. | |
| 9,790,968 B2 | 10/2017 | Yang et al. | |
| 9,919,418 B2 * | 3/2018 | Hashimoto | B25J 9/12 |
| 10,058,647 B2 | 8/2018 | Roche et al. | |
| 10,293,718 B1 | 5/2019 | Ilievski et al. | |
| 10,302,586 B2 * | 5/2019 | Sun | G01N 27/3335 |
| 10,465,723 B2 * | 11/2019 | Ilievski | B25J 9/1075 |
| 10,631,083 B1 | 4/2020 | Gandhi et al. | |
| 10,640,033 B1 | 5/2020 | Gandhi et al. | |
| 10,682,903 B1 | 6/2020 | Gandhi et al. | |
| 10,682,931 B2 | 6/2020 | Rowe et al. | |
| 10,749,448 B2 * | 8/2020 | Lindsay | G02B 3/14 |
| 10,797,217 B2 * | 10/2020 | Hakkens | H01L 41/193 |
| 10,946,535 B2 * | 3/2021 | Gandhi | B25J 18/06 |
| 2002/0100888 A1 | 8/2002 | Sharma et al. | |
| 2004/0107829 A1 | 6/2004 | Davis et al. | |
| 2004/0261411 A1 | 12/2004 | MacGregor | |
| 2005/0045480 A1 | 3/2005 | Krumme | |
| 2005/0198904 A1 | 9/2005 | Browne et al. | |
| 2005/0206096 A1 | 9/2005 | Browne et al. | |
| 2006/0038745 A1 | 2/2006 | Naksen et al. | |
| 2007/0046074 A1 | 3/2007 | Satta et al. | |
| 2007/0120438 A1 | 5/2007 | Divoux | |
| 2007/0246898 A1 | 10/2007 | Keefe et al. | |
| 2009/0086331 A1 | 4/2009 | Gunasekaran et al. | |
| 2009/0115285 A1 | 5/2009 | Najafi et al. | |
| 2010/0171393 A1 | 7/2010 | Pei et al. | |
| 2010/0254837 A1 | 10/2010 | Boersma et al. | |
| 2010/0258362 A1 | 10/2010 | Trimmer | |
| 2011/0188258 A1 | 8/2011 | Tajima | |
| 2012/0287493 A1 | 11/2012 | Kuhlman et al. | |
| 2013/0255815 A1 | 10/2013 | Brinkmann et al. | |
| 2013/0304049 A1 | 11/2013 | Behnke, II et al. | |
| 2013/0318962 A1 | 12/2013 | Joshi et al. | |
| 2014/0109560 A1 * | 4/2014 | Ilievski | B25J 9/142 60/327 |
| 2015/0331156 A1 | 11/2015 | Hirsa | |
| 2016/0106620 A1 | 4/2016 | Uno et al. | |
| 2017/0150252 A1 | 5/2017 | Trestain et al. | |
| 2018/0036198 A1 | 2/2018 | Mergl et al. | |
| 2018/0172172 A1 | 6/2018 | Oehler et al. | |
| 2018/0339624 A1 | 11/2018 | Leck | |
| 2019/0023161 A1 | 1/2019 | Sullivan et al. | |
| 2019/0032684 A1 | 1/2019 | Kowalewski et al. | |
| 2019/0059608 A1 | 2/2019 | Yan et al. | |
| 2019/0232822 A1 | 8/2019 | Hintermaier | |
| 2019/0296217 A1 | 9/2019 | Jung et al. | |
| 2019/0312193 A1 * | 10/2019 | Pelssers | H01L 41/042 |
| 2019/0326505 A1 * | 10/2019 | Pelssers | H01L 41/16 |
| 2020/0032822 A1 | 1/2020 | Keplinger et al. | |
| 2020/0066963 A1 * | 2/2020 | Johnson | F04D 13/027 |
| 2020/0130202 A1 | 4/2020 | Gandhi et al. | |
| 2020/0130321 A1 | 4/2020 | Gandhi et al. | |
| 2020/0132213 A1 | 4/2020 | Gandhi et al. | |
| 2020/0132223 A1 | 4/2020 | Prokhorov et al. | |
| 2020/0136525 A1 | 4/2020 | Gandhi et al. | |
| 2020/0156237 A1 * | 5/2020 | Tang | B25J 9/10 |
| 2020/0156314 A1 | 5/2020 | Rowe et al. | |
| 2020/0182269 A1 | 6/2020 | Rowe | |
| 2020/0189469 A1 | 6/2020 | Gandhi et al. | |
| 2020/0216121 A1 | 7/2020 | Gandhi et al. | |
| 2020/0238854 A1 | 7/2020 | Gandhi et al. | |
| 2020/0259426 A1 | 8/2020 | Rowe | |

FOREIGN PATENT DOCUMENTS

| | | |
|---|---|---|
| WO | 2017077541 A1 | 5/2017 |
| WO | 2018175741 A1 | 9/2018 |

OTHER PUBLICATIONS

SMC Tech, "Precision Regulator: Series IR1000/2000/3000", SMC Tech, pp. 713-725 and 1-19, 2015 (53 pages).

Knoss, "Next-gen flexible robots move and heal like us," CU Boulder Today, Jan. 4, 2018, retrieved from the Internet: <https://www.colorado.edu/today/2018/01/04/next-gen-flexible-robots-move-and-heal-us>, [retrieved Mar. 30, 2018] (6 pages).

Acome et al., "Hydraulically Amplified Self-Healing Electrostatic Actuators with Muscle-Like Performance," Science, vol. 359, Issue 6371, pp. 61-65 (Jan. 5, 2018) (6 pages).

Akle et al., "High-Strain Ionomeric-Ionic Liquid Electroactive Actuators," Science Direct, vol. 126, Issue 1, 173-181, (2006).

Acome et al., "Hydraulically Amplified Self-Healing Electrostatic Actuators with Muscle-Like Performance," Science, vol. 359, Issue 6371, 61-65, (2018).

Wang et al., "Soft Ultrathin Electronics Innervated Adaptive Fully Soft Robots", Advanced Materials, Feb. 5, 2018 (9 pages).

* cited by examiner

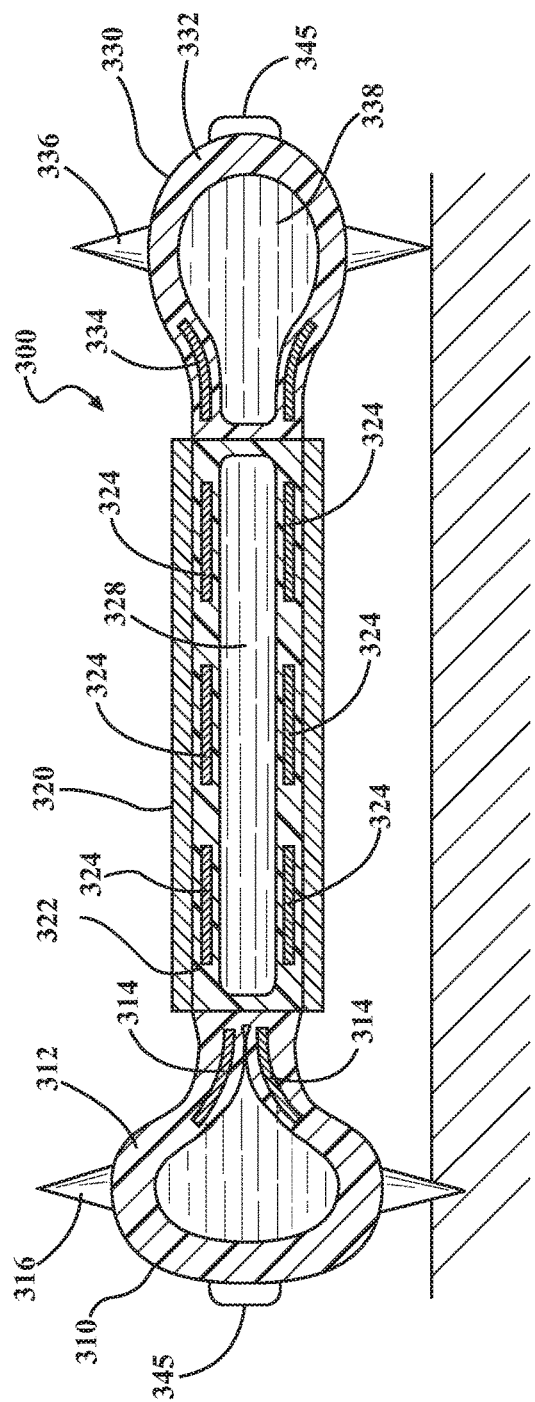
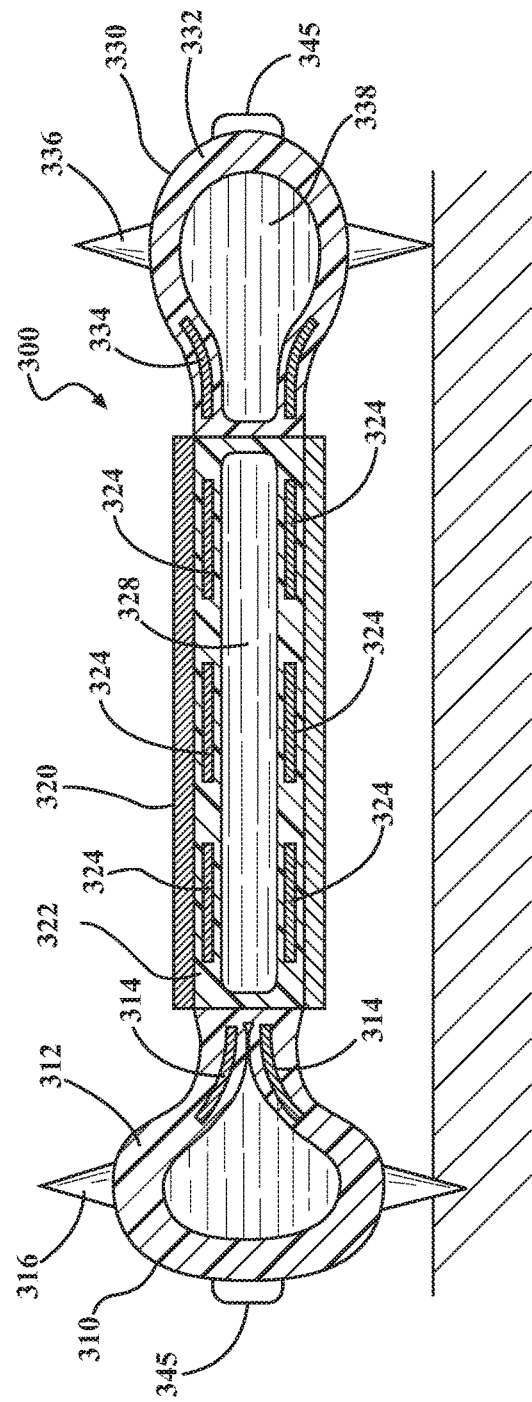
FIG. 3A
FIG. 3B

SOMERSAULTING MOTION OF SOFT BODIED STRUCTURE

TECHNICAL FIELD

The subject matter described herein generally relates to soft bodied structures and, more particularly, movable soft bodied.

BACKGROUND

Devices capable of complex motion, such as automatic or autonomous devices can be used for a variety of applications, such as in the home, outdoors, military and commercial uses. Many of these devices can be formed from rigid materials, such as metals or plastics, and move using a system of belts, wheels, or others. Conventional devices of this nature generally rely on rigid components for support and mobility and use a variety of sensors in moving from one position to another. Smaller devices can be better suited for certain tasks than larger devices. For example, they can help with rescue and exploration operations. Their small size can fit into a confined space, like in rubble or caves. As another example, a group of small mobile devices can provide robustness through redundancy for remote missions, such as outer space missions or other extreme environments.

SUMMARY

Disclosed herein is a soft bodied structure capable of performing a somersaulting motion, as well as related systems and methods for the same. In one or more implementations, a soft bodied structure is disclosed. The soft bodied structure can include a first end portion having a first actuator and a first surface attachment configured to attach to a surface upon actuation of the first actuator. The soft bodied structure can further include a second end portion having a second actuator and a second surface attachment configured to attach to a surface upon actuation of the second actuator. The soft bodied structure can further include a medial portion positioned between and connected to the first end portion and the second end portion. The medial portion can include one or more medial actuators. The medial portion can further include a controllably resistive material connected to the one or more medial actuators, the controllably resistive material providing a mechanical resistance upon receiving an input. The medial portion can further include a control device configured to control the first actuator, the second actuator, and the one or more medial actuators using one or more electrical inputs, and to create a somersault-like motion in the soft bodied structure relative to the surface.

In further implementations, a soft bodied structure is disclosed. The soft bodied structure can include a first end portion configured to hydraulically actuate in response to a first input and to controllably attach to a first contact point of a surface in response to the actuation of the first end portion. The soft bodied structure can further include a second end portion configured to hydraulically actuate in response to a second input and to controllably attach to a second contact point of the surface in response to the actuation of the second end portion, wherein the first end portion and the second end portion attached to the surface in an alternating fashion. The soft bodied structure can further include a medial portion positioned between and connected to the first end portion and the second end portion, the medial portion configured to expand substantially in one direction creating an arch. The soft bodied structure can further include an electrical device connected with the first end portion, the second end portion, and the medial portion, the electrical device configured to control the actuation of the first end portion, the second end portion, and the medial portion using one or more electrical inputs.

In further implementations, a soft bodied structure is disclosed. The soft bodied structure can include two end portions, each of the end portions having an end portion actuator and a surface attachment configured to attach to a surface upon actuation of the end portion actuator. The soft bodied structure can further include a medial portion positioned between and connected to the end portions, the medial portion having an exterior medial surface. The medial portion can include one or more medial actuators. The medial portion can further include a controllably resistive material connected to the one or more medial actuators, the controllably resistive material providing a mechanical resistance upon receiving an input. The soft bodied structure can further include a device control system for controlling the soft bodied structure to perform a somersaulting motion. The device control system can include one or more processors and a memory communicably coupled to the one or more processors. The memory can store instructions to cause the soft bodied structure to attach to a first contact point on the surface using the surface attachment and the end portion actuator of one of the end portions, creating a first attached end portion and an unattached end portion. The memory can further store instructions to actuate the one or more medial actuators to cause the medial portion to move such that the unattached end portion somersaults over the first attached end portion. The memory can further store instructions to cause the soft bodied structure to attach to a second contact point on the surface using the surface attachment and the end portion actuator of the unattached end portion, creating a second attached end portion. The memory can further store instructions to cause the surface attachment of the first attached end portion to detach from the surface. The memory can further store instructions to deactivate the one or more medial actuators and the controllably resistive material.

BRIEF DESCRIPTION OF THE DRAWINGS

So that the manner in which the above recited features of the present disclosure can be understood in detail, a more particular description of the disclosure, briefly summarized above, may be had by reference to the implementations, some of which are illustrated in the appended drawings. It is to be noted, however, that the appended drawings illustrate only typical implementations of this disclosure and are therefore not to be considered limiting of its scope. The disclosure may admit to other equally effective implementations.

FIGS. 3A-3E are depictions of a series of movements from an exemplary soft bodied structure, according to one or more implementations.

To facilitate understanding, identical reference numerals have been used, wherever possible, to designate identical elements that are common to the figures. Additionally, elements of one implementation may be advantageously adapted for utilization in other implementations described herein.

DETAILED DESCRIPTION

The implementations disclosed herein generally relate to a soft bodied structure capable of a somersault-like movement. The implementations described can enable movement of a soft bodied structure. The soft bodied structure can have various applications, including military and/or surveillance. In this example, the soft bodied structure can include one or more bladders in a variety of conformations, such as an elongated bladder, a series of bladders, or other configurations. The bladder(s) can contain a dielectric liquid. The bladder(s) can have a variety of cross-sectional shapes, such as a rectangular shape.

The soft bodied structure can further include attachment devices, such as hooks or other anchoring elements, at or near the longitudinal ends of the bladder(s). The attachment devices can be provided on one or more sides of the bladder(s). The soft bodied structure can further include a plurality of conductive portions, such as electrodes, distributed along the length of the bladder(s). The conductive portions can be provided in pairs on opposite sides of the bladder. The soft bodied structure can include flow restrictive devices or membranes, which can control the flow of the dielectric liquid within the bladder at that location. In one or more implementations, the soft bodied structure can further be configured to perform a somersault motion, allowing the soft bodied structure to move over a variety of surfaces. The implementations disclosed herein are more clearly described with reference to the figures below.

Figure 1:
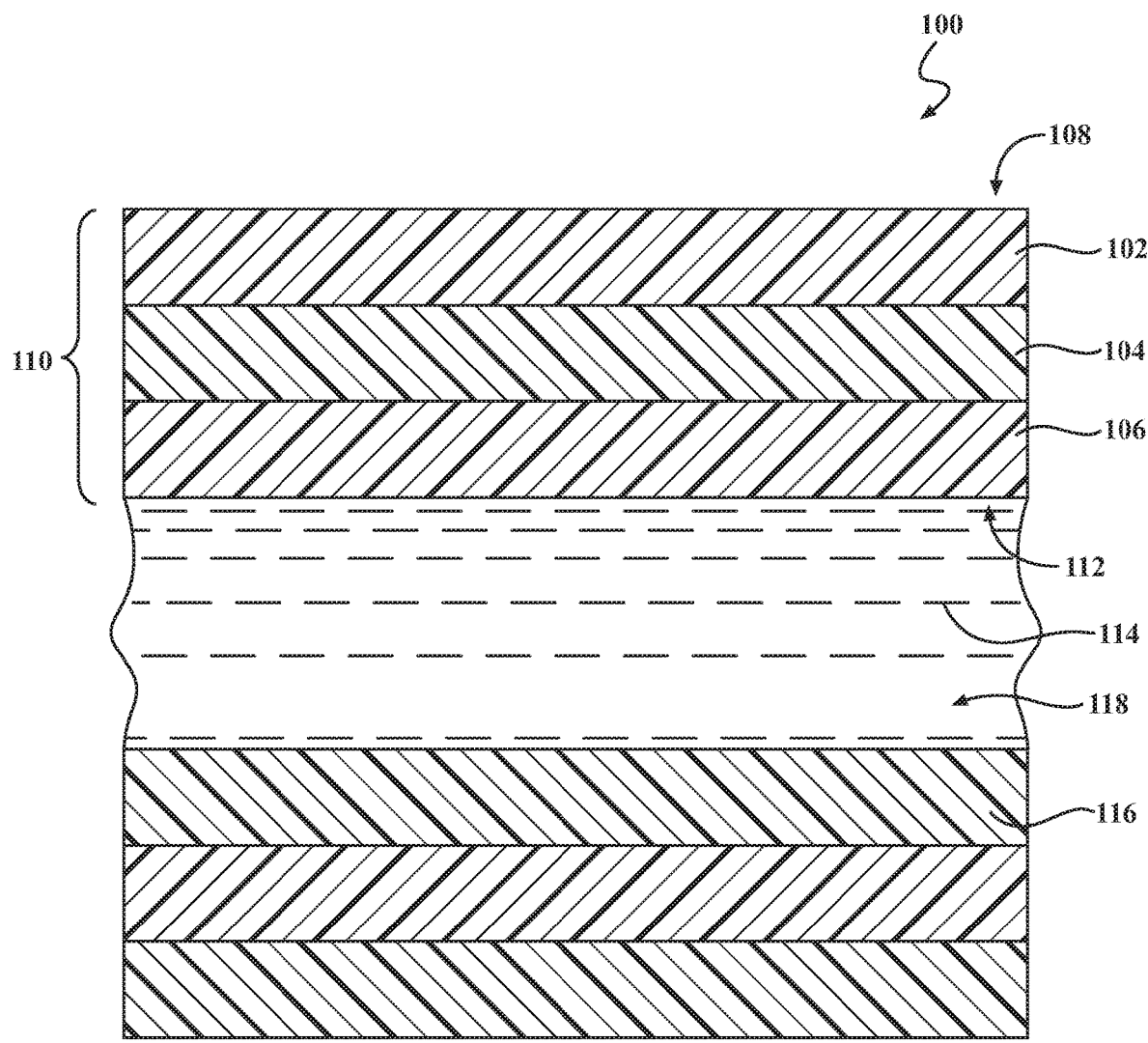
FIG. 1 is a sectional view of a soft bodied actuator, according to one or more implementations.

FIG. 1 is a sectional view of an actuator 100, according to one or more implementations. The actuator 100 can be a hydraulic actuator. As will be described herein, the actuator 100 can be configured for connection with a surface and for moving one or more objects. The actuator 100 can have a pliable or semi-pliable body, or can otherwise have a soft body. The actuator 100 can be an electrostatic device capable of displacing and/or affecting the flow of a fluid with the application of electric charge. The application of opposite electric charges can be used to attract two or more conductive elements together into an actuated position. "Actuated position," as used herein, refers to a position of the actuator in response to being activated. In one or more implementations, the actuated position can be achieved by delivering an electrical input to conductive portions of a fluid-impermeable membrane, as described herein. As a result, opposing conductive portions of the membrane can be brought toward each other via electrostatic attraction. Thus, hydraulic force can be created within the fluid-impermeable membrane. "Relaxed position," as used herein, refers to a position of the actuator when not in an activated state. In the relaxed position, the actuator 100 can be in a state without an input that causes electrostatic attraction to create a hydraulic force within the membrane. In one or more implementations, the relaxed position includes the original shape or substantially the original of the membrane, in response to stopping the electrical input to the conductive portions.

The actuator 100 can be capable of changing shape in the presence of the electric charge, causing fluid pressure to be applied to the portions of the actuator 100. This fluid pressure can then change the shape of the actuator 100, in relation to the elasticity of the fluid-impermeable membranes 110a and 110b. Thus, the actuator 100 has a first shape which is maintained in the absence of an electrical input. The electric charge to the actuator 100 can then be delivered, causing the actuator 100 to achieve to a second state, which can include one or more activated shapes due to hydraulic forces. When the charge is removed, the actuator 100 can then return to substantially the first shape.

As shown here, the actuator 100 can include fluid-impermeable membranes 110a and 110b and a dielectric fluid 114. The fluid-impermeable membranes 110a and 110b can be composed of layers, such as external insulating portions 102a and 102b, conducting portions 104a and 104b, and internal insulating portions 106a and 106b. "Portion," as used herein, relates to one or more components which form a layer, a portion of a layer, or structure in the fluid-impermeable membranes 110a and 110b of the actuator 100. The portions can have non-uniform coverage or thickness, as desired. The portions above are described as a single, uniform element or layer for simplicity purposes. However, the portions can include one or more of any of the layers, portions of layers, or variations as disclosed herein. As such, the portions may only partially extend the dimensions of the fluid-impermeable membranes 110a and 110b. As well, the portions of the fluid-impermeable membranes 110a and 110b can meet to form a seal, such that a chamber or compartment 118 is formed in the inner region of the fluid-impermeable membrane 110a and 110b. It should be noted that internal insulating portions 106a and 106b can be the same structure, or they can be separate structures. Further, external insulating portions 102a and 102b can be separate portions, or they can be the same structure.

The fluid-impermeable membranes 110a and 110b, or components thereof (e.g., the external insulating portions 102a and 102b, the conducting portions 104a and 104b, and/or the internal insulating portions 106a and 106b), can be flexible and/or elastic at one or more points and/or across one or more portions of the fluid-impermeable membranes 110a and 110b. In one implementation, the fluid-impermeable membranes 110a and 110b, or components thereof, are completely flexible and elastic. In another implementation, the fluid-impermeable membranes 110a and 110b are flexible across the entirety but only elastic across one or more strips of the fluid-impermeable membranes 110a and 110b. In another implementation, the fluid-impermeable membranes 110a and 110b are flexible and elastic at the external insulating portion 102a and 102b and the internal insulating portions 106a and 106b, but neither flexible nor elastic at the conducting portions 104a and 104b. One skilled in the art will understand the variety of combinations of flexibility, elasticity, and positioning of the portions of the fluid-impermeable membranes 110a and 110b, without further explicit recitation of specific examples herein.

The external insulating portion 102a and 102b can form an exterior surface 108 of the fluid-impermeable membranes 110a and 110b. In one implementation, the external insulating portion 102a and 102b can form the entire exterior surface of the fluid-impermeable membranes 110a and 110b. The external insulating portion 102a and 102b can be flexible and/or elastic at one or more portions. In one implementation, the external insulating portions 102a and 102b are entirely flexible and elastic. In another implementation, the external insulating portion 102a and 102b can have interspersed regions of flexibility, or flexibility and elasticity. The interspersed regions can be in a pattern or random, as desired. The external insulating portion 102a and 102*b* can form an interface with the surface of one or more inner layers, such as the internal insulating portions 106*a* and 106*b* and/or the conducting portions 104*a* and 104*b*.

The external insulating portion 102*a* and 102*b* can include a polymer, an elastomeric polymer (elastomer) or both. The use of a plurality of different encapsulating elastomers and/or polymers of varying degrees of softness and hardness can be employed. The polymers used in the implementations described herein can further include the addition of a plasticizer, such as phthalate esters. The polymers or elastomers may be natural or synthetic in nature. Examples of elastomers usable as part of the external insulating portion 102*a* and 102*b* can include an insulating elastomer, such as nitrile, ethylene propylene diene monomer (EPDM), fluorosilicone (FVMQ), vinylidene fluoride (VDF), hexafluoropropylene (HFP), tetrafluoroethylene (TFE), perfluoromethylvinylether (PMVE), polydimethylsiloxane (PDMS), natural rubber, neoprene, polyurethane, silicone, silicone rubber, or combinations thereof. The external insulating portion 102*a* and 102*b* can be described with regards to electrical insulation. The electrical insulation of the external insulating portion 102*a* and 102*b* can be described or selected in relation to the dielectric constant, or κ value, of said material. The term "elastomer," as used herein, means a material which can be stretched by an external force at room temperature to at least twice its original length, and then upon immediate release of the external force, can return to its original length. Room temperature can generally refer to a temperature in a range of from about 20° C. to about 25° C. Elastomers, as used herein, can include a thermoplastic, and may be cross-linked or thermoset.

The conducting portions 104*a* and 104*b* can be largely or entirely internal elements of the fluid-impermeable membranes 110*a* and 110*b*. The conducting portions 104*a* and 104*b* can be conductive to electrical current, such that the conducting portion creates an electric field. In one implementation, the conducting portions 104*a* and 104*b* can be formed between the external insulating portion 102*a* and 102*b* and the internal insulating portions 106*a* and 106*b*. In another implementation, the conducting portions 104*a* and 104*b* can include hydrogels. The conducting portions 104*a* and 104*b* can further include a polymer, an elastomeric polymer (elastomer) or both. Examples of elastomers usable as part of the conducting portions 104*a* and 104*b* can include nitrile, EPDM, fluorosilicone (FVMQ), vinylidene fluoride (VDF), hexafluoropropylene (HFP), tetrafluoroethylene (TFE), perfluoromethylvinylether (PMVE), polydimethylsiloxane (PDMS), natural rubber, neoprene, polyurethane, silicone, or combinations thereof. The conducting portions 104*a* and 104*b* can be composed or further include a conductive material, such as an electrically conductive dopant. Electrically conductive dopants can include silver, gold, platinum, copper, aluminum, or others. In further implementations, the conducting portions 104*a* and 104*b* can include inks and adhesives, for the purpose of flexibility and/or conductivity.

The internal insulating portions 106*a* and 106*b* can form an interior surface 112 of the fluid-impermeable membranes 110*a* and 110*b*. The internal insulating portions 106*a* and 106*b* can be composed of a material similar to that of the external insulating portion 102*a* and 102*b*. In one or more implementations, the internal insulating portions 106*a* and 106*b* can include an insulating elastomer, such as nitrile, EPDM, fluorosilicone (FVMQ), vinylidene fluoride (VDF), hexafluoropropylene (HFP), tetrafluoroethylene (TFE), perfluoromethylvinylether (PMVE), polydimethylsiloxane (PDMS), natural rubber, neoprene, polyurethane, silicone, or combinations thereof. In one or more implementations, the internal insulating portions 106*a* and 106*b* can include polymers and elastomers having a high electric breakdown voltage and not electrically conductive. The internal insulating portions 106*a* and 106*b* can further include a protective layer 116. The protective layer 116 can be formed between the internal insulating portions 106*a* and 106*b* and a dielectric fluid 114, as shown in FIG. 1. In some arrangements, the protective layer 116 can form a part of the interior surface 112. The protective layer 116 can be uniform or vary in size or composition. Further, the protective layer 116 can be non-conductive and/or resistant to corrosion. In one or more implementations, the protective layer 116 is a flexible and corrosion resistant plastic, such as fluorinated ethylene propylene (FEP).

The fluid-impermeable membranes 110*a* and 110*b* can be sealed at one or more edges, such that the fluid-impermeable membranes 110*a* and 110*b* can form a fluid-impermeable compartment 118. However, in some implementations, the fluid-impermeable membranes 110*a* and 110*b* (or portions thereof) may not be separate structures but instead are a unitary structure. The compartment can hold the dielectric fluid 114. The dielectric fluid 114 can be a fluid that is resistant to electrical breakdown and/or provides insulation. In one or more implementations, the dielectric fluid 114 can prevent arcing between one or more opposing layers (e.g., the opposing conducting portions 104). The dielectric fluid 114 can be a lipid based fluid, such as a vegetable oil-based dielectric fluid. The dielectric fluid 114 can be ethylene glycol. The dielectric fluid 114 can have an associated dielectric constant, or κ value.

Figure 2A:
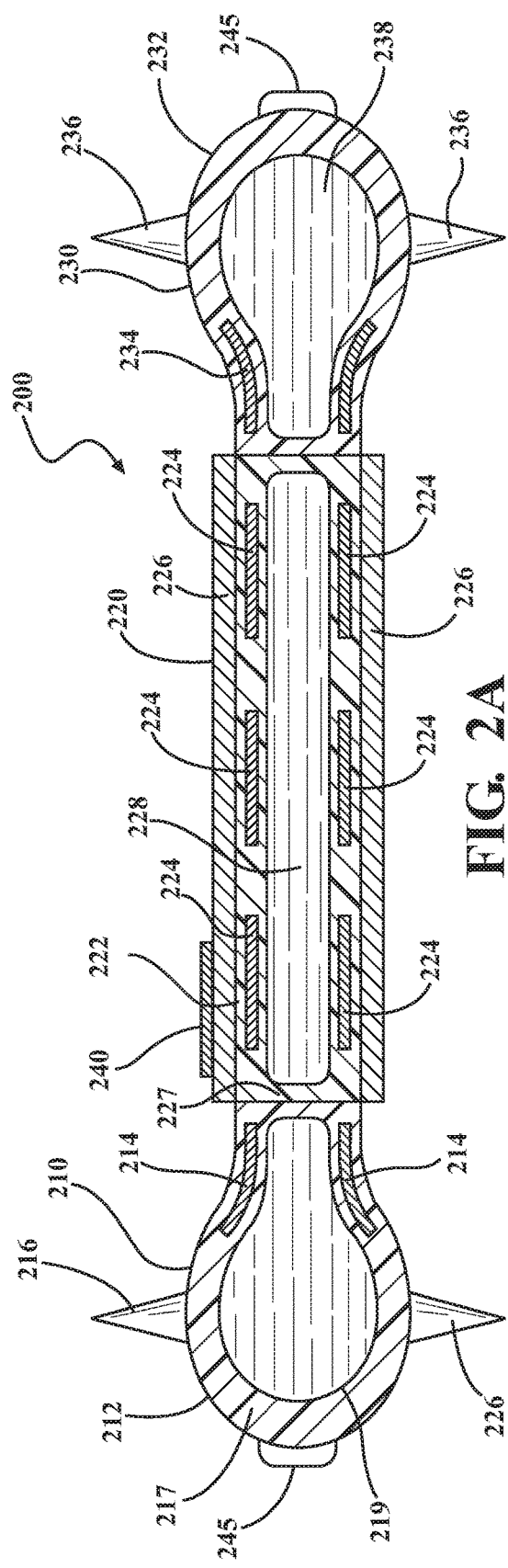
FIGS. 2A and 2B are exemplary illustrations of soft bodied structures, according to one or more implementations.
Figure 2B:
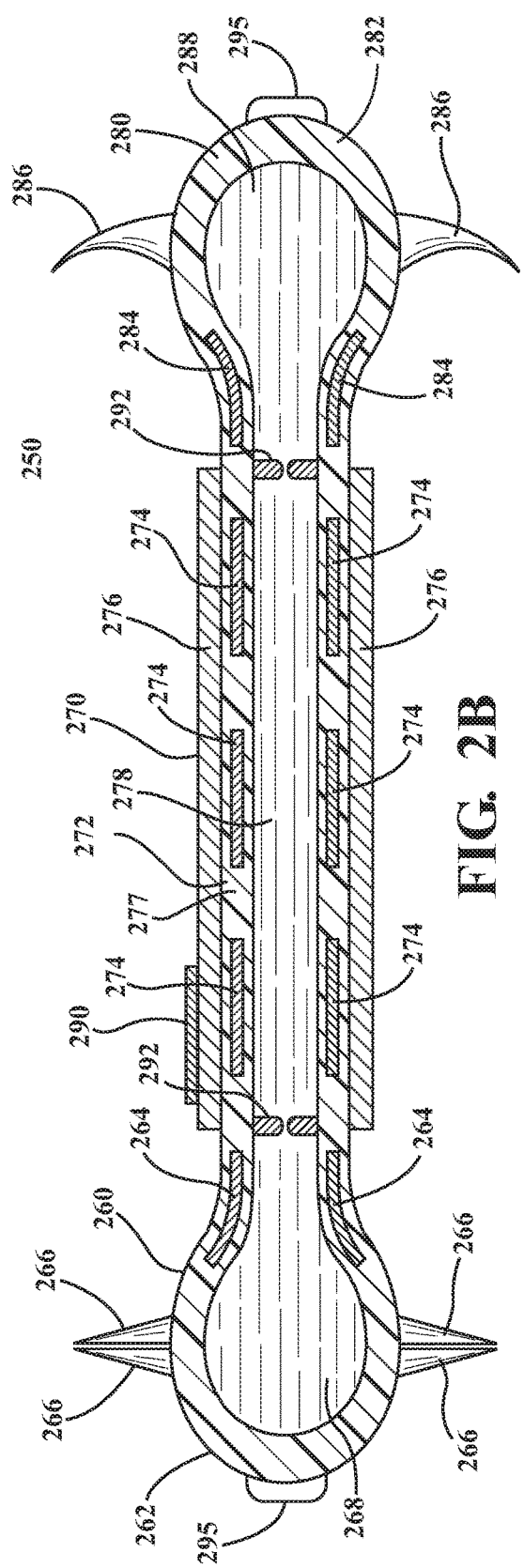

FIGS. 2A and 2B are illustrations of soft bodied structures 200 and 250, according to one or more implementations. The soft bodied structures 200 and 250 can include a variety of components which can allow for multidirectional somersaulting movement. FIG. 2A is a side view of the soft bodied structure 200, according to one or more implementations. The soft bodied structure 200 can be configured to create fluid pressure at one or more points, such that the soft bodied structure 200 can somersault across a surface. "Somersault" or "flip," as used herein, generally relates to a movement of an elongated object that includes a first end of the object being brought over an opposite second end of the object. The movement can include at least a portion of an elongated object revolving, curling, curving, arching, and/or bending over itself.

The soft bodied structure 200 can include a control unit 240, a first end portion 210, a second end portion 230, and a medial portion 220. The first end portion 210 can be connected with the medial portion 220 in a linear fashion, such as connected in series. As well, the second end portion 230 can be connected with the medial portion 220 in a linear fashion, such as connected in series. In the example shown here, the first end portion 210 is connected with the medial portion 220 which is connected to the second end portion 230, in series. The use of "first" and "second" is not intended to imply order or directionality in the soft bodied structure 200, as the device can operate in a variety of directions and the apparent positioning of the components can be reversed in a variety of ways. The first end portion 210, the second end portion 230, and the medial portion 220 can be different portions of the same continuous body of the soft bodied structure 200.

The first end portion 210, the medial portion 220, and the second end portion 230 can be substantially similar to the actuator 100, described with reference to FIG. 1. As used herein, the term "substantially" includes exactly the term it modifies and slight variations therefrom. Thus, the term "substantially similar" means exactly the same and slight variations therefrom. In this particular example, slight variations therefrom can include within normal manufacturing tolerances, within about 10 degrees/percent or less, within about 5 degrees/percent or less, within about 4 degrees/percent or less, within about 3 degrees/percent or less, within about 2 degrees/percent or less, or within about 1 degrees/percent or less.

The first end portion 210 can include a fluid-impermeable membrane 212. The fluid-impermeable membrane 212 can include conductive portions 214. The conductive portions 214 can be positioned to compress the fluid-impermeable membrane 212 upon receiving an electric input. In one example, the conductive portions 214 can be positioned on substantially opposing sides or portions of the fluid-impermeable membrane 212. Though shown here as two conductive portions 214, the conductive portions 214 can include more than two.

Further, the conductive portions 214 can be configured in a pair or other groups, such that the conductive portions 214 are capable of selectively compressing at least a portion of the fluid-impermeable membrane 212. The conductive portions 214 can be substantially similar to the conductive portions 104a and 104b, described with reference to FIG. 1. The fluid-impermeable membrane 212 can at least partially define a first chamber 217. The first chamber 217 can contain a dielectric fluid 218. The dielectric fluid 218 can be substantially similar to the dielectric fluid 114, described with reference to FIG. 1.

The first end portion 210 can further include one or more surface attachments 216, depicted here as two (2) surface attachments 216. The surface attachments 216 can be one or more devices capable of attaching to and detaching from a surface. In one or more implementations, the surface attachments 216 can be hooks, needles, pins, spikes, a gripping device, combinations thereof, pluralities thereof, or other devices for attaching the first end portion 210 to the surface. In one or more implementations, the surface attachments 216 can attach to a surface in response to a hydraulic force applied to the first end portion 210. For instance, the surface attachments 216 can engage or embed into a surface. The surface attachments 216 can include a rigid material, such as a plastic, a metal, or combination thereof.

Various parameters of the surface attachments 216 can be altered to create a connection. Examples of some parameters can include positioning of the surface attachments 216 with respect to the first end portion 210, the spacing of the surface attachments 216 with respect to each other, actuation of a mechanism (e.g., a pliers-like gripping device), or others.

The medial portion 220 can be positioned in line with the first end portion 210. The medial portion 220 can include one or more fluid-impermeable membranes 222. The fluid-impermeable membranes 222 can be a different portion of the membrane for the soft bodied structure 200. The fluid-impermeable membranes 222 can include conductive portions 224. The conductive portions 224 can be positioned to compress the fluid-impermeable membrane 222 upon receiving an electric input. In one example, the conductive portions 224 can be positioned at regular or irregular intervals along a single fluid-impermeable membrane 222. The conductive portions 224 can be positioned on substantially opposing sides of the fluid-impermeable membrane 222. The conductive portions 224 can be configured in a pair or other groups, such that the conductive portions 224 are capable of compressing at least a portion of the fluid-impermeable membrane 222 when they move toward each other. The conductive portions 224 can be substantially similar to the conductive portions 104a and 104b, described with reference to FIG. 1. The fluid-impermeable membranes 222 can form one or more medial chambers 227. The medial chambers 227 can contain a dielectric fluid 228. The dielectric fluid 228 can be substantially similar to the dielectric fluid 114, described with reference to FIG. 1.

The medial portion 220 can further include one or more controllably resistive material layers 226. In this example, the soft bodied structure 200 is depicted with two (2) controllably resistive material layers 226. However, in some implementations, they can be a single layer. In further implementations, the controllably resistive material layers 226 can comprise panels which substantially cover the exterior of the medial portion 220. In one example, the one or more controllably resistive material layers can include numerous individual layers which surround an exterior surface of the medial portion. The controllably resistive material layers 226 are layers of a material which can be controllably made to resist stretch, bend or other distortion based on a first input, such as an electrical input. Then, in response to additional input or removal of the first input, the controllably resistive material layers 226 can then be brought back to an original level of elasticity, malleability, or other distortion characteristics. The controllably resistive material layers 226 can be an electroactive polymer, such as piezoelectric polymers, ionic polymer metal composites, or others. In further implementations, the controllably resistive material layers 226 can include a series of actuators, such as the actuators 100, to create resistance to deformation on one side of the fluid-impermeable membrane 222. The controllablly resistive material layers 226 can allow the material characteristics to be altered in individual areas of the controllably resistive material layers 226 or across the entire controllably resistive material layer 226.

The second end portion 230 can be positioned in line with and extend from the medial portion 220. The second end portion 230 can include a fluid-impermeable membrane 232. The fluid-impermeable membranes 232 can be a continuation of the fluid-impermeable membrane 222. The fluid-impermeable membrane 232 can include conductive portions 234. The conductive portions 234 can be positioned to compress the fluid-impermeable membrane 232 upon receiving an electric input. As shown here, the conductive portions 234 can be positioned on substantially opposing sides or portions of the fluid-impermeable membrane 232 at one side. The conductive portions 234 can be positioned such that they deliver a significant portion of the hydraulic force to the distal end of the fluid-impermeable membrane 232. As with the conductive portions 214, the conductive portions 234 can be configured such that the conductive portions 234 are capable of selectively compressing at least a portion of the fluid-impermeable membrane 232. The conductive portions 234 can be substantially similar to the conductive portions 104a and 104b, described with reference to FIG. 1. The fluid-impermeable membrane 232 can at least partially define a second chamber 237. The second chamber 237 can contain a dielectric fluid 238. The dielectric fluid 238 can be substantially similar to the dielectric fluid 114, described with reference to FIG. 1.

The second end portion 230 can further include one or more surface attachments 236, depicted here as two (2) surface attachments 236. The surface attachments 236, similar to the surface attachments 216, can be one or more devices capable of attaching and detaching to a surface. In one or more implementations, the surface attachments 236 can be hooks, needles, pins, spikes, a gripping device, combinations thereof, pluralities thereof, or other devices for attaching the second end portion 230 to the surface. In one or more implementations, the surface attachments 236 can attach to a surface in response to a hydraulic force applied to the second end portion 230. The surface attachments 236 can include a rigid material, such as a plastic, a metal, or combination thereof, and can be positioned such that they are in contact with a surface.

The second end portion 230 can further include the one or more sensors 245. "Sensor," as used herein generally relates to any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process. The one or more sensors 245 can include cameras, microphones, accelerometers, gyroscopes, and others as desired for collecting information about an environment or the soft bodied structure 200. Though shown as connected with the second end portion 230, the location of the one or more sensors 245 is not intended to be limiting. The one or more sensors 245 can be located in any location on the soft bodied structure 200 which does not expressly prevent the function of said sensors 245 and/or interfere with the motion of the soft bodied structure 200.

Various parameters of the surface attachments 236 can be altered to create at least a desired (e.g., temporary, semi-permanent, etc.) connection to the surface. Parameters can include positioning of the surface attachments 236 with respect to the second end portion 230, the spacing of the surface attachments 236 with respect to each other, actuation of a mechanism (e.g., a pliers-like gripping device), or others. Further, though described as substantially similar to the first end portion 210, the second end portion 230 can differ substantially from the first end portion 210, such as differences in component types, compositions, shapes, positioning or others, as noted for the various implementations of components used herein.

FIG. 2B is a side view of the soft bodied structure 250, according to one or more implementations. The soft bodied structure 250 can be configured to create fluid pressure at one or more points, such that the soft bodied structure 250 can somersault across a surface. The soft bodied structure 250 can include a first end portion 260, a medial portion 270, a second end portion 280, and a control unit 290. The first end portion 260 can be connected with the medial portion 270 in a linear fashion, such as connected in series. As well, the second end portion 280 can be connected with the medial portion 270 in a linear fashion, such as connected in series. In the example shown here, the first end portion 260 is fluidly connected with the medial portion 270 which is fluidly connected to the second end portion 280, in series. The fluid connection allows for increased inter-chamber hydraulic control. The first end portion 260, the medial portion 270, and the second end portion 280 can be substantially similar to the actuator 100, described with reference to FIG. 1.

The first end portion 260 can include a fluid-impermeable membrane 262. The fluid-impermeable membrane 262 can include conductive portions 264. The conductive portions 264 can be positioned to compress the fluid-impermeable membrane 262 upon receiving an electric input. In one example, the conductive portions 264 can be positioned on substantially opposing sides of the fluid-impermeable membrane 262. The conductive portions 264 can be substantially similar to the conductive portions 104a and 104b, described with reference to FIG. 1. The fluid-impermeable membrane 262 can form a first chamber 267. The first chamber 267 can contain a dielectric fluid 268. The dielectric fluid 268 can be substantially similar to the dielectric fluid 114, described with reference to FIG. 1.

The first end portion 260 can further include one or more surface attachments 266, depicted here as four (4) surface attachments 266. The surface attachments 266 can be one or more devices capable of reversibly attaching to a surface. In one or more implementations, the surface attachments 266 can be hooks, needles, a gripping device, combinations thereof, pluralities thereof, or other devices for attaching the first end portion 260 to the surface. In one or more implementations, the surface attachments 266 can attach to a surface in response to a hydraulic force applied to the first end portion 260. Shown here, the surface attachments 266 can be configured to separate upon a hydraulic pressure being applied to the fluid-impermeable membrane 262. The surface attachments 266 can include a rigid material, such as a plastic, a metal, or combination thereof. Further, the surface attachments 266 can be positioned such that they are in contact with a surface, such as embedding into the surface. Here, the various parameters of the surface attachments 266 can be altered to create a connection, described above with reference to FIG. 2A.

The first end portion 260 can further include the one or more sensors 295. The sensor 295 as used herein can be substantially similar to the one or more sensors 245, described with reference to FIG. 2A. The one or more sensors 245 can include cameras, microphones, accelerometers, gyroscopes, and others as desired for collecting information about an environment or the soft bodied structure 200. Though shown as connected with the first end portion, the location of the one or more sensors 295 is not intended to be limiting. The one or more sensors 295 can be located in any location which does not expressly prevent the function of said sensors 295.

The medial portion 270 can be positioned in line with the first end portion 260. The medial portion 270 can include one or more fluid-impermeable membranes 272. Each of the fluid-impermeable membranes 272 can include conductive portions 274. The conductive portions 274 can be positioned to compress the fluid-impermeable membrane 272 upon receiving an electric input. In one example, the conductive portions 274 are positioned at specific intervals along the fluid-impermeable membrane 272. The conductive portions 274 can be positioned on substantially opposing sides of the fluid-impermeable membrane 272. The conductive portions 274 can be configured in a pair or other groups, such that the conductive portions 274 are capable of compressing at least a portion of the fluid-impermeable membrane 272. The conductive portions 274 can be substantially similar to the conductive portions 104a and 104b, described with reference to FIG. 1. The fluid-impermeable membranes 272 can form one or more medial chambers 277. The medial chambers 277 can contain a dielectric fluid 278. The dielectric fluid 278 can be substantially similar to the dielectric fluid 114, described with reference to FIG. 1.

The medial portion 270 can further include one or more controllably resistive material layers 276. In this example, the soft bodied structure 250 is depicted with two (2) controllably resistive material layers 276. The controllably resistive material layers 276 are layers of a material which can be controllably made to resist stretch, bend or other distortion based on a first input. Then, in response to additional input or removal of the first input, the controllably resistive material layers 276 can then be brought back to an original level of elasticity, malleability, or other distortion characteristics. The controllably resistive material layers 276 can be an electroactive polymer, such as piezoelectric polymers, ionic polymer metal composites, or others. In further implementations, the controllably resistive material layers 276 can include a series of actuators, such as the actuators 100, to create resistance to deformation on one side of the fluid-impermeable membrane 272. In further implementations, the one or more controllably resistive material layers 276 can be one or more hinges or other rigid mechanisms for directionally controlling movement. Thus, the one or more controllably resistive material layers 276 can provide controllability to affect the somersaulting motion in conjunction with one or more further components described herein.

The second end portion 280 can be positioned in line with and extend from the medial portion 270. The second end portion 280 can include a fluid-impermeable membrane 282. The fluid-impermeable membrane 282 can include conductive portions 284. The conductive portions 284 can be positioned to compress the fluid-impermeable membrane 282 upon receiving an electric input. As shown here, the conductive portions 284 can be positioned on substantially opposing sides of the fluid-impermeable membrane 282 at one side. The conductive portions 284 can be positioned such that they deliver a significant portion of the hydraulic force to the distal end of the fluid-impermeable membrane 282. As with the conductive portions 264, the conductive portions 284 can be configured such that the conductive portions 284 are capable of compressing at least a portion of the fluid-impermeable membrane 282. The conductive portions 284 can be substantially similar to the conductive portions 104a and 104b, described with reference to FIG. 1. The fluid-impermeable membrane 282 can form a second chamber 287. The second chamber 287 can contain a dielectric fluid 288. The dielectric fluid 288 can be substantially similar to the dielectric fluid 114, described with reference to FIG. 1.

The second end portion 280 can further include one or more surface attachments 286, depicted here as two (2) surface attachments 286. The surface attachments 286, similar to the surface attachments 266, can be one or more devices capable of reversibly attaching to a surface. In one or more implementations, the surface attachments 286 can be hooks, needles, a gripping device, combinations thereof, pluralities thereof, or other devices for attaching the second end portion 280 to the surface. Shown here, the surface attachments 286 are hooks. In one or more implementations, the surface attachments 286 can attach to a surface in response to a hydraulic force applied to the second end portion 280. In this example, the surface attachments 286 are configured to rotate slightly toward the medial portion 270 when the conductive portions 284 create hydraulic pressure on the fluid-impermeable membrane 282. The surface attachments 286 can include a rigid material, such as a plastic, a metal, or combination thereof, and can be positioned such that they are in contact with a surface. Further, as shown here, the surface attachments 286 can differ substantially from the surface attachments 266, such as differences in component types, compositions, shapes, positioning, or others. The various parameters of the surface attachments 286 can be altered to create at least a semi-permanent connection to the surface, as described above with reference to the surface attachments 236 of FIG. 2A.

As shown here, the soft bodied structure 250 can be fluidly connected across the first end portion 260, the medial portion 270, and the second end portion 280 using a plurality of controllably permeable membranes 292. The controllably permeable membranes 292 can allow flow between the chambers when the proximate conductive portions are not actuated. Further, the flow of the dielectric fluid 268, 278, and 288 can be reduced or controlled by the controllably permeable membranes 292, such as by pores, valves, closable components or others as desired. As such, the fluid pressure created in one portion (e.g., the medial portion 270) can be controlled and transmitted between the remaining portions (e.g., the first end portion 260 and the second end portion 280).

The soft bodied structure 250 can further include the control unit 290. The control unit 290 can be a device which provides instructions to coordinate movement of the soft bodied structure 250. In some implementations, the control unit 290 can be a computing device, which is described in greater detail with respect to FIG. 4 below. In further implementations, the control unit 290 can be a communications device for receiving instructions from a remote source, such as a computing device or a user. The control unit 290 can be in electrical communication with one or more components of the soft bodied structure 250, such as the conductive portions 264, 274 and 284, and/or the controllably resistive material layers 276. The electrical communication can be wires, wire traces, layers of conductive material, or others, such that electricity can be transmitted from the control unit 290 to the desired component of the soft bodied structure 250.

When described in reference to the actuator 100 of FIG. 1, the soft bodied structures 200 and 250 can be connected through a variety of formations or combinations of one or more implementations of the actuator 100. As shown in FIG. 2A, the soft bodied structure 200 can be described as a linear combination of one (1) actuator 100 forming the first end portion 210, three (3) fluidly connected actuators 100 forming the medial portion 220, and one (1) actuator 100 forming the second end portion 230. As shown in FIG. 2B, the soft bodied structure 250 can be described as a linear combination of five fluidly connected actuators, having one (1) actuator 100 forming the first end portion 260, three (3) fluidly connected actuators 100 forming the medial portion 270, and one (1) actuator 100 forming the second end portion 280. The formations or combinations of the actuator 100 can include one or more actuators, or components thereof, forming the end portions or the medial portions of the soft bodied structures 200 and 250.

Thus, the soft bodied structures 200 and 250 can move and interact for numerous applications, such as for military and industrial purposes. Through a series of sequential or simultaneous actuations, the soft bodied structures 200 and 250 can connect with a surface using a first end and bend to attach a second end to a further point on the surface. The soft bodied structures 200 and 250 are capable of traversing a variety of terrains by a somersaulting motion, allowing the soft bodied structures 200 and 250 to ignore certain difficulties, such as rugged or low traction surfaces.

FIGS. 3A-3E depict a soft bodied structure 300 performing a variety of motions in an environment, according to one or more implementations. As described above, the soft bodied structure can include a first end portion 310, a medial portion 320 and a second end portion 330. In a sequence of actions, the soft bodied structure 300 can move along a surface 340. The soft bodied structure 300 can connect to a surface at the first end portion 310. With the first end portion 310 connected to the surface, the medial portion 320 can undergo a somersaulting motion to bring the second end portion 330 over a first end portion 310. The second end portion 330 can be connected to the surface at a new position. The soft bodied structure 300 can then release the medial portion 320 and the first end portion 310. At this point, the soft bodied structure 300 will have moved, and the soft bodied structure 300 can rest of the surface in an "upside down" orientation relative to its orientation before performing the above sequence of actions.

The movement of the soft bodied structure 300 can begin with FIG. 3A. FIG. 3A depicts the soft bodied structure 300 initiating a somersault movement, according to one or more implementations. Shown here is the first end portion 310 marked with a numerical indicator 1, to show the steps of movement. The first end portion 310 includes a surface attachment 316 and a fluid-impermeable membrane 312. The fluid-impermeable membrane 312 can include opposing conductive portions 314 and can contain a dielectric fluid 318. Here, the first end portion 310 of the soft bodied structure 300 is shown with the conductive portions 314 actuated. The actuation of the conductive portions 314 causes the conductive portions 314 to move toward each other. As a result, hydraulic pressure can be created in the first end portion 310, which can cause expansion of a distal end portion of the fluid-impermeable membrane 312. The expansion can force at least one of the surface attachments 316 into connection with a surface 340. The connection of the surface attachment 316 to the surface 340 can be as described above with reference to FIGS. 2A and 2B. The soft bodied structure 300 can further include one or more sensors 345. The sensors 345 can be substantially similar to the sensors 245, described with reference to FIG. 2A.

The medial portion 320 and the second end portion 330 of the soft bodied structure 300 can be deactivated or in a relaxed position during this time. The conductive portions 324 and 334 are not receiving an electrical input. The first end portion 310 can be fluidly separated from the medial portion 320 and the second end portion 330, such as by a flow stopper. In this way, the dielectric fluid 318 can deliver hydraulic force to the fluid-impermeable membrane 312, without applying force to the medial portion 320 or the second end portion 330.

FIG. 3B depicts a subsequent moment in time in which the soft bodied structure 300 performs a further action in the somersault movement, according to one implementation. The first end portion 310 is shown here having the surface attachment 316 and the fluid-impermeable membrane 312 with the conductive portions 314 actuated. Thus, the surface attachments 316 are in connection with the surface 340. Then, an electrical input is provided to the controllably resistive material layer 326. The medial portion 320 can then be more resistive to flexing or stretching in at least one direction (i.e., the controllably resistive material layer 326 is resisting movement in at least one direction). This can be done in discrete areas of the controllably resistive material layer 326 or across the entire controllably resistive material layer 326. In some implementations, the controllably resistive material layer 326 can be activated in such a way to provide a bend or other movement in a desired direction, such as the direction of rotation for later movements. The medial portion 320 and the second end portion 330 of the soft bodied structure 300 can be maintained in a relaxed position during this time.

Figure 3C:
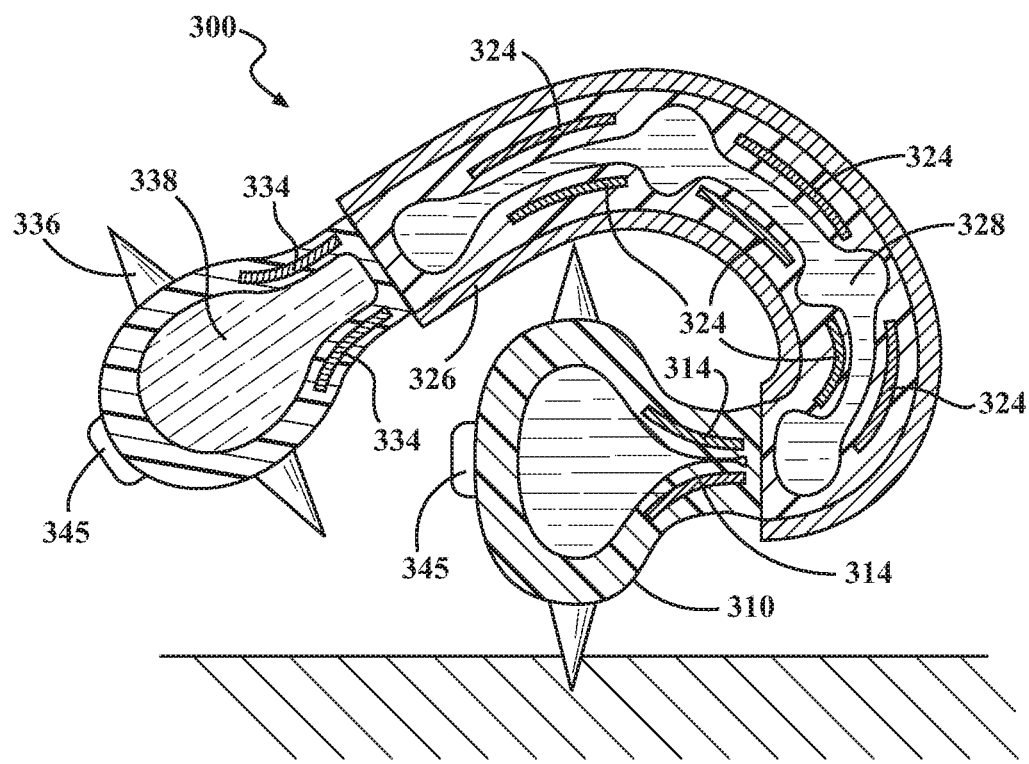

FIG. 3C depicts a subsequent moment in time in which the soft bodied structure 300 performs a further action in the somersault movement, according to one implementation. Here, the first end portion 310 is shown with maintained connection with the surface 340, as described above. Further, the electrical input can be maintained to the controllably resistive material layer 326. The medial portion 320 can then be actuated to an actuated position by activating the opposing conductive portions 324. The conductive portions 324 can be activated by an electrical input. The electrical input can be delivered to the conductive portions 324 from a control unit, as described with reference to FIGS. 2A and 2B, and/or using any suitable power source (e.g., a battery). The conductive portions 324 can be actuated in unison or in any order such that hydraulic force is delivered to the fluid-impermeable membrane 322. In one example, the conductive portions 324 are actuated in pairs, starting from the most distant side of the medial portion 320. As a result, the conductive portions 324 on the upper side of the soft bodied structure 300 (as shown in FIGS. 3A-3B) can have a first charge, and the conductive portions 324 on the lower side of the soft bodied structure 300 (as shown in FIGS. 3A-3B) can have a second charge that is opposite to the first charge.

As the pairs of opposing conductive portions 324 are attracted toward each other due to their opposite charges, the dielectric fluid 318 can be forced in the lateral direction away from the interface. However, due to a limited space within the medial chamber 327, hydraulic pressure can develop within the medial chamber 327. The hydraulic pressure can be exerted on the fluid-impermeable membrane 322. The hydraulic pressure causes the regions between the conductive portions 324 to expand outward (e.g., bulge). As a result, it can cause the soft bodied structure 300 to bend in the direction of the controllably resistive material layer 326 as activated in FIG. 3B. This expansion and bend results in the second end portion 330 to pass over the first end portion 310 in a somersault movement. The second end portion 330 of the soft bodied structure 300 can be maintained in a relaxed position during this time. The second end portion 330 can be located on or near the surface 340.

Figure 3D:
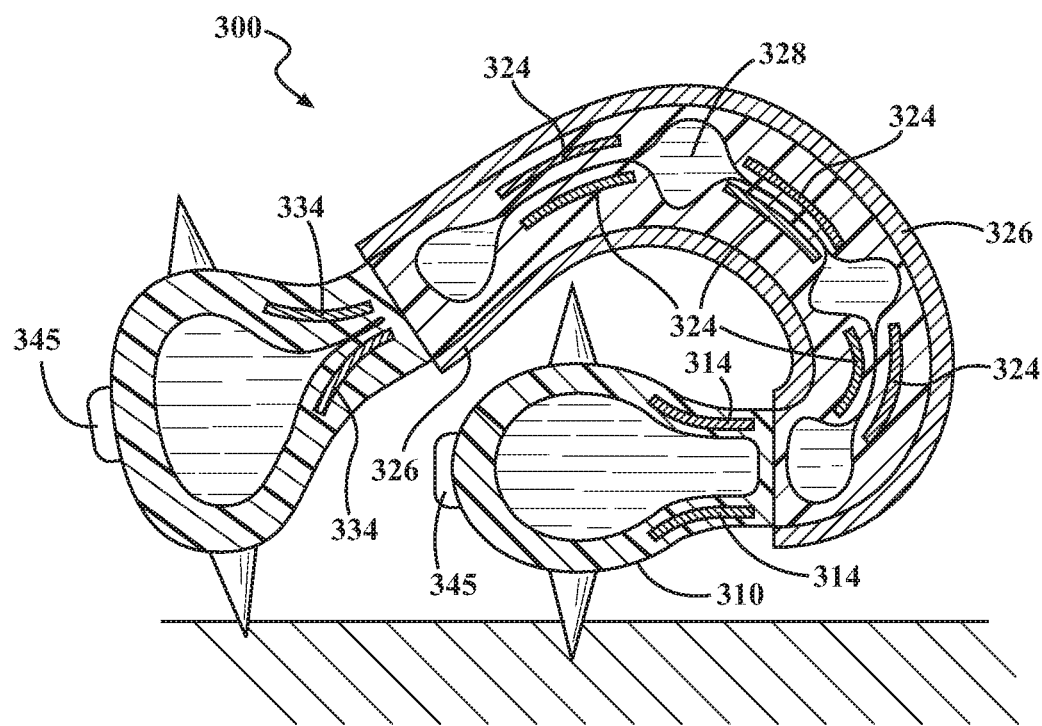

FIG. 3D depicts a subsequent moment in time in which the soft bodied structure 300 performs a further action of the somersault movement, according to one implementation. The first end portion 310 can be maintained in connection with the surface 340. The second end portion 330 can then be actuated to an actuated position by activating the opposing conductive portions 334. The actuation of the conductive portions 334 creates a hydraulic pressure, as described with relation to the first end portion 310, to bring at least one of the surface attachments 336 into connection with a surface 340. The connection of the surface attachment 336 to the surface 340 can further include elements as described above with reference to FIGS. 2A and 2B.

Once the second end portion 330 is attached to the surface 340 or any time hereafter, the first end portion 310 and the controllably resistive material layer 326 of the soft bodied structure 300 can be deactivated or in the relaxed position. The second end portion 330 can be fluidly separated from the medial portion 320 and the first end portion 310. In this way, the dielectric fluid 338 can deliver hydraulic force to the fluid-impermeable membrane 332, without applying force to the medial portion 320 or the first end portion 310.

Figure 3E:
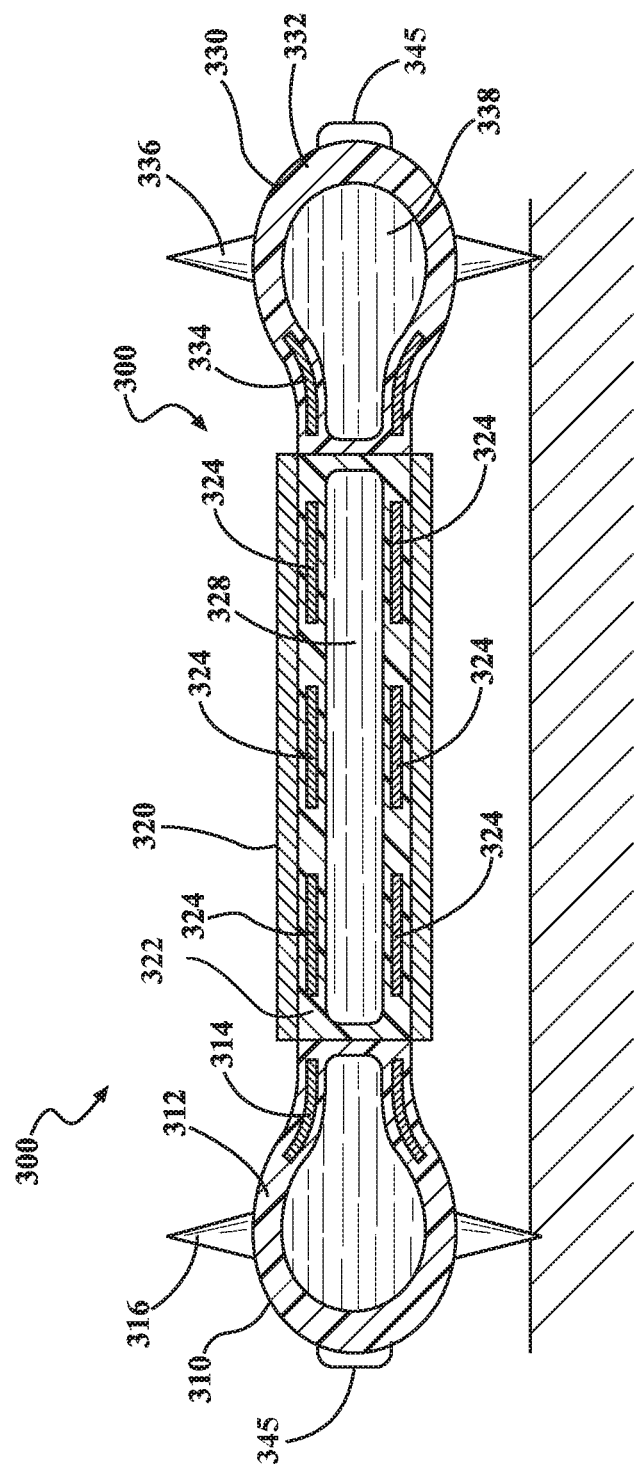

FIG. 3E depicts a subsequent moment in time in which the soft bodied structure 300 performs a further action in the somersault movement, according to one implementation. The first end portion 310 is shown here having the surface attachment 316 and the fluid-impermeable membrane 312 with the conductive portions 314 deactivated. Thus, the surface attachments 316 can be detached from the surface 340. Further, an electrical input can be removed from the controllably resistive material layer 326 and the conductive portions 324. Thus, the medial portion 320 can then be relaxed in all directions.

The second end portion 330 can be deactivated or in a relaxed position by deactivating the conductive portions 334, such as by discontinuing electrical input to the conductive portions 334. Thus, the second end portion 330 can be detached from the surface 340. At this point, the soft bodied structure 300 will have moved along the surface 340, and the soft bodied structure 300 can rest of the surface in an "upside down" orientation relative to its initial orientation in FIG. 3A.

It is understood that the steps shown in FIGS. 3A-3E can be repeated in sequence, which, in some cases, can create a continuous motion. To continue motion from FIG. 3E, the first end portion 310 and the second end portion 330 are reversed in the sequence, such that the actuations in FIG. 3A involve the second end portion 330 rather than the first end portion 310. This sequence is then continued and can result in the first end portion 310, the medial portion 320 and the second end portion 330 of the soft bodied structure 300 are back in the original orientation (i.e., two somersaults in the same direction).

Thus, through the elements described above, the soft bodied structure 300 can move across a surface 340. The soft bodied structure 300 is capable of crossing a wide variety of surfaces, moving in confined areas and overcoming obstacles. Thus, the soft bodied structure 300 can be applied to non-traditional terrains, such as off-road or harsh environments.

In further embodiments, a method for somersaulting motion is disclosed. The method can include the operation of a soft bodied structure as described above. The soft bodied structure can include a series of actuators, such as a series of soft bodied hydraulic actuators. The method of operating the soft bodied structure can include activating an actuator at the first end portion of the soft bodied structure to cause a first surface attachment to engage the surface. The method of operating the soft bodied structure can further include activating the plurality of actuators in the medial portion to cause the medial portion to undergo a somersaulting motion such that the second end portion moves over the second end portion. In further implementations, the method can include activating the actuator at the second end portion of the soft bodied structure to cause a second surface attachment to engage the surface. In yet further implementations, the method can include deactivating the actuator at the first end portion of the soft bodied structure to cause the first attachment to disengage the surface. In yet further implementations, the method can include deactivating the plurality of actuators in the medial portion to cause the medial portion to substantially return to a non-activated shape. In yet further implementations, the method can include deactivating the actuator at the second end portion of the soft body structure to cause the second anchor to disengage the surface.

Figure 4:
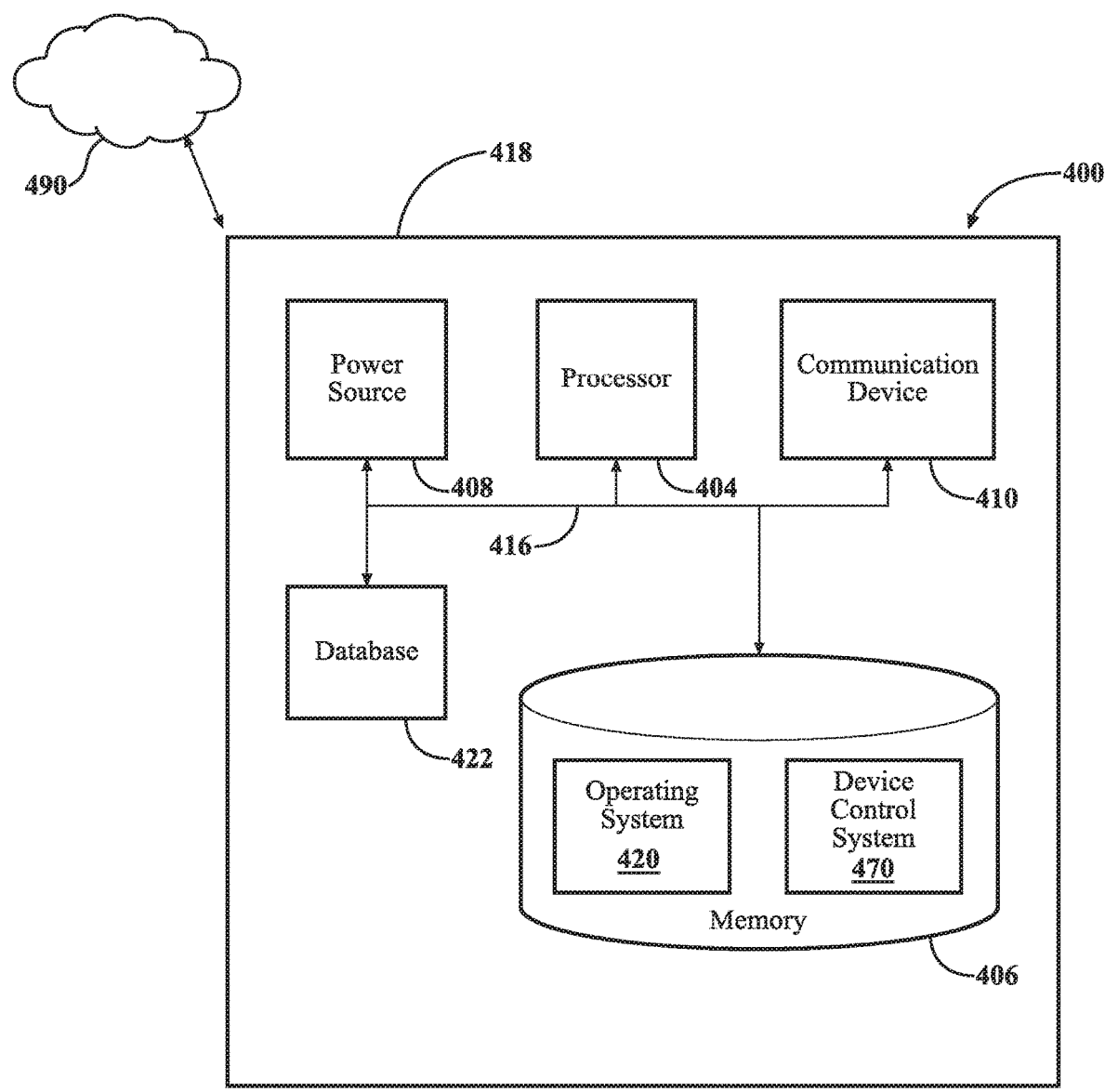
FIG. 4 is a computing device adaptable for use with one or more implementations described herein.

FIG. 4 is a block diagram of the computing device 400 usable with the soft bodied structure described above, according to one or more implementations. The computing device 400 can be any appropriate type of computing device such as, but not limited to, a server, a personal computer (PC), workstation, embedded computer, or stand-alone device with a computational unit, such as a microprocessor, DSP (digital signal processor), FPGA (field programmable gate array), or ASIC (application specific integrated circuit), or others. The computing device 400 can contain various components for performing the functions that are assigned to the said computing device. The components can include a processor 404, like a central processing unit (CPU), a memory 406, a power source 408, communications device 410, input and/or output devices, and at least one bus 416 that connects the components above. In some implementations, one or more of these components are at least partially housed within a housing 418.

The processor 404, which can also be referred to as a CPU, can be a device which is capable of receiving and executing one or more instructions to perform a task as part of a computing device. In one implementation, the processor 404 can include a microprocessor such as an application specific instruction set processor (ASIP), graphics processing unit (GPU), a physics processing unit (PPU), a DSP, an image processor, a co-processor, or others. Though referenced as the processor 404, it is understood that one or more processors 404 can be used in one or more implementations described herein, including combinations of processors 404.

The memory 406 is any hardware that is capable of storing data or information. Examples of data or information which can be stored in the memory 406 include, without limitation, data, program code in functional form, and/or other suitable information either on a temporary basis and/or a permanent basis. The memory 406 can include one or more modules that include computer-readable instructions that, when executed by the processor 404, cause the processor 404 to perform methods and functions that are discussed herein. The memory 406 can include volatile and/or non-volatile memory. The memory 406 can further include a computer-readable storage medium. Examples of suitable memory 406 include RAM (Random Access Memory), flash memory, ROM (Read-Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof.

The memory 406 can be a component of the processor(s) 404, or the memory 406 can be operably connected to the processor(s) 404 for use thereby. The memory 406 can include an operating system 420, such as LINUX. The operating system 420 can include batch, live, time sharing, real-time, and other types of operating systems. The operating system 420, as described herein, can include instructions for processing, accessing, writing, storing, searching data, or other functions as selected by the user for controlling and providing an interface with the computing device 400. The memory 406 can include communications procedures for communicating with the network 490, the soft bodied structure 300, and/or another computing device.

The communication device 410 can be wired or wireless connection components and/or software allowing the computing device 400 to communicate with other computing devices. The communication device 410 can allow communication with devices either locally or remotely, such as over a network protocol (e.g., Ethernet or similar protocols). In one example, the computing device 400 is connected to the network 490 using the communication device 410. The communication device 410 can further be connected with remote devices associated with other computing devices. In further implementations, the computing device 400 can connect with one or more computing devices, allowing access to one or more sensors, which are connected to or in connection with the second computing device.

The computing device 400 can further include a device control system 470 or components thereof. As described herein, certain components of the device control system 470 can be stored in the control unit 240, the control unit 290, the computing device 400 or combinations thereof. As such, one or more implementations of the device control system 470 can include the device control system 470, modules thereof, or components thereof as being stored, collected, created, compared or otherwise made available from the memory 406 or the database 422 of the computing device 400. When stored as part of the computing device 400, the device control system 470 can access the soft bodied structure 300, another computing device 400, or other devices through the communications device 410 and the network 490, allowing for continuity between the one or more components which comprise the device control system 470.

In one or more implementations, the computing device 400 can be in communication with a soft bodied structure, such as the soft bodied structure 200 and 250, described with reference to FIGS. 2A and 2B. The computing device 400 can interact with the soft bodied structure through instructions from the device control system 470. In some arrangements, one or more elements of the computing device 500 can be located on or in the soft bodied structure.

Figure 5:
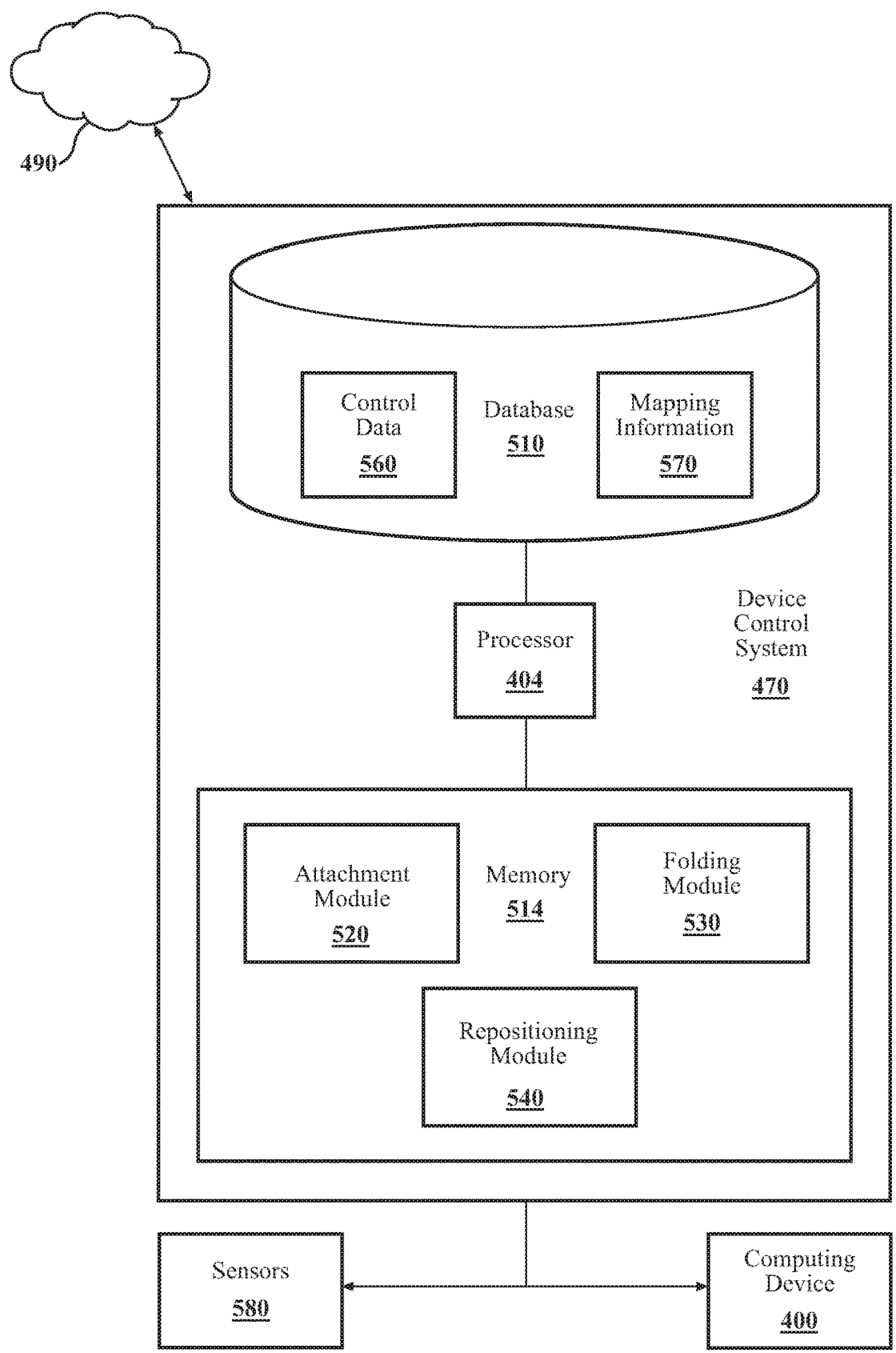
FIG. 5 is a device control system for the soft bodied structure, according to one or more implementations.

The discussion of the device control system 470 begins at FIG. 5, with an illustration of the device control system 470, according to one implementation. The device control system 470 is shown as including the processor 404 from the computing device 400, depicted in FIG. 4. Accordingly, the processor 404 can be a part of the device control system 470, the device control system 470 can include a separate processor from the processor 404 or the device control system 470 can access the processor 404 through a data bus or another communication path. In one implementation, the device control system 470 includes the memory 514 that can store an attachment module 520, a folding module 530, and/or a repositioning module 540. The memory 514 can be a RAM, ROM, a hard disk drive, a flash memory, or other suitable memory for storing the modules 520, 530, and 540. The modules 520, 530, and 540 are, for example, computer-readable instructions that when executed by the processor 404, cause the processor 404 to perform the various functions disclosed herein.

Further, one or more sensors can be used for collection of data as part of the device control system 470. The one or more sensors 245 can collect sensor data about the environment. "Sensor data," as used herein, generally relates to any information collected by the sensors that the soft bodied structure 200 is equipped with, including the capabilities and other information about the sensors themselves. As an example, in one or more implementations, the sensor data can be stored as part of the include information from one or more of cameras, microphones, or others of the one or more sensors 245. In some implementations, at least a portion of the sensor data can be located in one or more data stores, such as the database 510 as part of the device control system 470. Alternatively, or in addition to, at least a portion of the sensor data can be located in one or more data stores that are located remotely from the soft bodied structure 200, such as the database 422 of the computing device 400.

The device control system 470 can further include a database 510. The database 510 can be presented in some configurations, including as part of the memory 514, as an independent component from the memory 514, as part of a separate memory (distinct from memory 514), or others. The database 510 can include control data 560 and mapping information 570. The control data 560 can include data sets as detected or determined about each of the actuators regarding the order of operation, maximum deformation, current deformation, useful life and other details which can be used to control the soft bodied structure during use. The mapping information 570 can include information related to the current environment or others which can provide benefit to the mobility of the soft bodied structure. The device control system 470 or portions thereof, can be stored as part of the computing device 400, as part of a server, or others. As such, one or more of the functions of the device control system 470 or of the modules contained therein, can be performed remotely and transferred to the soft bodied structure as part of the implementations described herein.

The attachment module 520 can generally include instructions that function to control the processor 404 to connect to cause the soft bodied structure to connect to a first contact point of a surface using a surface attachment and the actuator associated with the respective end portion. The first contact point is a point or area on the surface where the surface attachment engages the surface. The attachment module 520 can, through instructions to the processor 404, cause the end portion actuator to actuate and create hydraulic pressure on the membrane of the end portion. This actuation can cause the surface attachment to attach to the surface. The attachment of the surface attachment to the surface can be substantially similar to the surface attachment described with reference to FIGS. 3A-3E. The attachment module 520 can access control data 560, as stored in the database 510, to determine the actuators to control, the force of actuation required and other information related to desired attachment to the surface.

The actuation, relaxation, or another controlled event can be controlled by an activation signal. The activation signal is a signal from a user or an object for creating a response in the soft bodied structure. The activation signal can be delivered by the attachment module 520 based on the modulation of a switch, predetermined instructions, or others. When delivered from a user, the activation signal can be received directly by the attachment module 520 or through a network, such as the network 490. The activation signal can further include individualized input or group input for one or more soft bodied structures that are in connection with the device control system 470. In another implementation, the activation signal is a signal delivered by the user indicating the desire to program or control the soft bodied structure, according to implementations described herein. The activation signal or the input can be stored as part of the control data 560, such as in the database 510.

In some implementations, the attachment module 520 can further include instructions to selectively increase or decrease the rigidity of a section of spacer regions when such regions include a controllably resistive material. The controllably resistive material can be substantially similar to the controllably resistive material layers 226 and 276, as described above with reference to FIGS. 2A and 2B. In embodiments in which the rigidity of the spacer regions are controllable, the attachment module 520 can increase the rigidity of the controllably resistive material by delivering an electrical input. The selection of which spacer region(s) to activate can be determined by the desired direction, as determined from the mapping information 570. The mapping information 570 can be stored as part of the database 510.

The folding module 530 can generally include instructions that function to control the processor 404 to actuate the medial actuators to selectively expand an exterior medial surface of the medial portion. The medial actuators can include a series of conductive portions in the medial portion, as described with reference to FIGS. 2A and 2B. The conductive portions of the medial portion can be actuated in a specific order, such as from the attached end portion to the unattached end portion. In further implementations, the conductive portions can be activated and actuated simultaneously. The order of actuation can be controlled based on information in the control data 560, such as for creating expansion in the desired regions to create a specific bend, controlling distribution of the dielectric fluid within the fluid-impermeable membrane, or others. The expansion of the exterior medial surface can create a bend around the controllably resistive material. This bend can bring the unconnected end region over the connected end region and in contact with a second contact point on the surface.

The folding module 530 can further include instructions to attach the unattached end portion to a second contact point, creating a second attached end portion. The second contact point, similar to the first contact point, can be a point or area on the surface where the end portion actuator and the related surface attachment is at or near the surface. Through instructions to the processor 404, the folding module 530 can cause the unattached end portion actuator to actuate and create hydraulic pressure on the fluid-impermeable membrane of said actuator. This actuation can cause the surface attachment to attach to the surface at the second contact point, which holds the soft bodied structure in the bent or folded position. The attachment of the surface attachment to the surface can be substantially similar to the surface attachment 316, described with reference to FIGS. 3A-3E. The folding module 530 can access control data 560, as stored in the database 510, to determine the actuators to control, the force of actuation required and other information related to desired attachment to the surface.

The repositioning module 540 can generally include instructions that function to control the processor 404 to cause the surface attachment of the first attached end portion to detach from the surface. Here, the repositioning module 540 can cause the end portion actuator of the first attached end portion to relax, thus reducing the hydraulic pressure on the fluid-impermeable membrane of the said end portion. This relaxation can cause the surface attachment to retract from the surface at the first contact point and allow the soft bodied structure to uncurl from the folded position at the first attached end portion. The detachment of the surface attachment from the surface can be substantially similar to the relaxation of the first end portion 310, described with reference to FIG. 3D.

The repositioning module 540 can further include instructions to release the one or more medial hydraulic actuators and/or the controllably resistive material. The repositioning module 540 can withdraw the electrical input at the medial hydraulic actuators and/or the controllably resistive material, such that the soft bodied structure relaxes into a new position on the surface. The medial hydraulic actuators and/or the controllably resistive material can be relaxed in any order, such that the soft bodied structure rests against the surface. Here, the soft bodied structure has reversed orientation, such that the second attached end portion is facing the direction of motion for the soft bodied structure.

The repositioning module 540 can further include instructions to detach the surface attachment of the second attached end portion. The second attached end portion can be detached by relaxing the end portion actuators. Here, the repositioning module 540 can cause the end portion actuator of the second attached end portion to relax. This relaxation can reduce the hydraulic pressure on the fluid-impermeable membrane of the second attached end portion, causing the surface attachment to release the surface at the second contact point. The soft bodied structure can then return to a state with the end portions relaxed from the surface. The detachment of the surface attachment from the surface can be substantially similar to the relaxation of the first end portion 310, described with reference to FIG. 3D.

The modules can be implemented as computer-readable program code that, when executed by a processor, implement one or more of the various processes described herein. One or more of the modules can be a component of the processor(s) 504, or one or more of the modules can be executed on and/or distributed among other processing systems to which the processor(s) 1504 are operatively connected. The modules can include instructions (e.g., program logic) executable by one or more processor(s) 504. Alternatively or in addition, one or more data stores or memory may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Thus, the device control system 470 can regulate the movement of the soft bodied mobile device. The soft bodied mobile device can change from a first position to a second position on the surface, by using hydraulic force from the actuators in the end portions and the medial portion. The device control system 470 and the soft bodied mobile device can provide numerous benefits. The device control system 470 and the soft bodied mobile device can allow for autonomous and independent movement across a variety of terrains. Further, the device control system 470 and the soft bodied mobile device can perform a variety of autonomous functions, such as to fulfill outdoor or military needs. The device control system 470 can convert individual movements into controllable sequences for the soft bodied structure, allowing the soft bodied structure to be intelligently controlled.

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-5, but the implementations are not limited to the illustrated structure or application.

The flowcharts and block diagrams in the figures illustrate the architecture, functionality, and operation of possible implementations of systems, methods, devices, and computer program products according to various implementations. In this regard, each block in the flowcharts or block diagrams can represent a module, segment, or portion of code, which can include one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which can include all the features enabling the implementation of the methods described herein and, which when loaded in a processing system, is able to carry out these methods.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one implementation or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure. While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A soft bodied structure comprising:
   a first end portion comprising:
      a first actuator; and
      a first surface attachment configured to attach to a surface upon actuation of the first actuator;
   a second end portion comprising:
      a second actuator; and
      a second surface attachment configured to attach to a surface upon actuation of the second actuator;
   a medial portion positioned between and connected to the first end portion and the second end portion, the medial portion comprising;
      one or more medial actuators;
      a controllably resistive material connected to the one or more medial actuators, the controllably resistive material providing a mechanical resistance upon receiving an input; and
   a control device configured to control the first actuator, the second actuator, and the one or more medial actuators using one or more electrical inputs, and to create a somersault-like motion in the soft bodied structure relative to the surface.

2. The soft bodied structure of claim 1, wherein the first actuator, the second actuator, and the one or more medial actuators are fluidly connected through a shared fluid-impermeable compartment.

3. The soft bodied structure of claim 1, wherein each of the first actuator, the second actuator, and the one or more medial actuators comprise:
   a first insulating portion forming a fluid-impermeable compartment, the first insulating portion comprising an insulating elastomer;
   a dielectric fluid contained within the fluid-impermeable compartment;
   a first conducting portion connected to an outer surface of the first insulating portion, the first insulating portion comprising a conductive material; and
   a second conducting portion connected to an outer surface of the first insulating portion and separated from the first conducting portion by the fluid-impermeable compartment, the second conducting portion comprising a conductive material; and
   a second insulating portion surrounding an exterior surface of the first conducting portion and the second conducting portion.

4. The soft bodied structure of claim 3, wherein the first insulating portion contains one or more polymers, the polymers being configured to control direction of elasticity.

5. The soft bodied structure of claim 3, wherein the fluid-impermeable compartment of the first actuator, the second actuator, and the one or more medial actuators is a shared fluid-impermeable compartment.

6. The soft bodied structure of claim 1, wherein the first surface attachment and the second surface attachment are hooks.

7. The soft bodied structure of claim 1, wherein the controllably resistive material is a solid electroactive polymer.

8. The soft bodied structure of claim 1, wherein the controllably resistive material includes a plurality of independently controllable subsections.

9. A soft bodied structure comprising:
   a first end portion configured to hydraulically actuate in response to a first input and to controllably attach to a first contact point of a surface in response to an actuation of the first end portion;
   a second end portion configured to hydraulically actuate in response to a second input and to controllably attach to a second contact point of the surface in response to the actuation of the second end portion, wherein the first end portion and the second end portion attach to the surface in an alternating fashion;
   a medial portion positioned between and connected to the first end portion and the second end portion, the medial portion configured to expand substantially in one direction creating an arch; and
   an electrical device connected with the first end portion, the second end portion, and the medial portion, the electrical device configured to control the actuation of the first end portion, the second end portion, and the medial portion using one or more electrical inputs.

10. The soft bodied structure of claim 9, wherein the first end portion comprises a first actuator, wherein the second end portion comprises a second actuator, and wherein the medial portion comprises a medial actuator.

11. The soft bodied structure of claim 10, wherein each of the first actuator, the second actuator, and the medial actuator comprise:
   a first insulating portion forming a fluid-impermeable compartment, the first insulating portion comprising an insulating elastomer;
   a dielectric fluid contained within the fluid-impermeable compartment;
   a first conducting portion connected to an outer surface of the first insulating portion, the first insulating portion comprising a conductive material; and
   a second conducting portion connected to an outer surface of the first insulating portion and separated from the first conducting portion by the fluid-impermeable compartment, the second conducting portion comprising a conductive material; and
   a second insulating portion surrounding an exterior surface of the first conducting portion and the second conducting portion.

12. The soft bodied structure of claim 11, wherein the first insulating portion contains one or more polymers, the polymers being configured to control direction of elasticity.

13. The soft bodied structure of claim 11, wherein the fluid-impermeable compartment of the first actuator, the second actuator, and the medial actuator is a shared fluid-impermeable compartment.

14. The soft bodied structure of claim 9, wherein the first end portion comprises one or more first surface attachments and the second end portion comprises one or more second surface attachments.

15. The soft bodied structure of claim 9, wherein the medial portion comprises one or more controllably resistive material layers.

16. The soft bodied structure of claim 15, wherein the one or more controllably resistive material layers surround an exterior surface of the medial portion.

17. A soft bodied structure comprising:
   two end portions, each of the end portions comprising:
      an end portion actuator; and
      a surface attachment configured to attach to a surface upon actuation of the end portion actuator;
   a medial portion positioned between and connected to the end portions, the medial portion having an exterior medial surface, the medial portion comprising;
      one or more medial actuators; and
      a controllably resistive material connected to the one or more medial actuators, the controllably resistive material providing a mechanical resistance upon receiving an input; and
   a device control system for controlling the soft bodied structure to perform a somersaulting motion, comprising:
      one or more processors; and
      a memory communicably coupled to the one or more processors and storing instructions to:
         cause the soft bodied structure to attach to a first contact point on the surface using the surface attachment and the end portion actuator of one of the end portions, creating a first attached end portion and an unattached end portion;
         actuate the one or more medial actuators to cause the medial portion to move such that the unattached end portion somersaults over the first attached end portion;

cause the soft bodied structure to attach to a second contact point on the surface using the surface attachment and the end portion actuator of the unattached end portion, creating a second attached end portion;

cause the surface attachment of the first attached end portion to detach from the surface; and deactivate the one or more medial actuators and the controllably resistive material.

18. The soft bodied structure of claim 17, wherein the surface attachment of each of the end portions is a hook.

19. The soft bodied structure of claim 17, wherein the controllably resistive material is a solid electroactive polymer.

20. The soft bodied structure of claim 17, wherein the one or more medial actuators are sequentially actuated.

* * * * *